United States Patent
Toussaint et al.

(10) Patent No.: US 12,434,279 B2
(45) Date of Patent: Oct. 7, 2025

(54) PYROLYSIS VAPOUR CONDENSER SYSTEM AND METHOD OF CONDENSING PYROLYSIS VAPOUR

(71) Applicant: BTG BioLiquids B.V., Enschede (NL)

(72) Inventors: Adrianus Aegidius Johannes Toussaint, Enschede (NL); Elwin Gansekoele, Enschede (NL)

(73) Assignee: BTG BioLiquids B.V., Enschede (NL)

( * ) Notice: Subject to any disclaimer, the term of this patent is extended or adjusted under 35 U.S.C. 154(b) by 0 days.

(21) Appl. No.: 17/919,657

(22) PCT Filed: Apr. 22, 2021

(86) PCT No.: PCT/NL2021/050262
§ 371 (c)(1),
(2) Date: Oct. 18, 2022

(87) PCT Pub. No.: WO2021/215922
PCT Pub. Date: Oct. 28, 2021

(65) Prior Publication Data
US 2023/0158556 A1    May 25, 2023

(30) Foreign Application Priority Data
Apr. 23, 2020   (NL) ................................. 2025409

(51) Int. Cl.
*B08B 9/045* (2006.01)
*B01D 5/00* (2006.01)

(52) U.S. Cl.
CPC .............. *B08B 9/045* (2013.01); *B01D 5/003* (2013.01); *B01D 5/0096* (2013.01); *B08B 2209/04* (2013.01)

(58) Field of Classification Search
CPC .................................................... B01D 5/0096
See application file for complete search history.

(56) References Cited

U.S. PATENT DOCUMENTS

| | | | | |
|---|---|---|---|---|
| 2,380,098 A | * | 7/1945 | Doerner ................ | F27D 25/003 266/271 |
| 4,731,937 A | * | 3/1988 | Premel ...................... | C10J 3/84 432/83 |
| 5,451,297 A | * | 9/1995 | Roy ........................ | C22B 1/005 201/35 |

(Continued)

FOREIGN PATENT DOCUMENTS

| | | |
|---|---|---|
| AT | 346251 B | 11/1978 |
| DE | 620227 C | 10/1935 |

(Continued)

*Primary Examiner* — Natasha N Campbell
(74) *Attorney, Agent, or Firm* — Bret E. Field; Bozicevic, Field & Francis LLP (57) ABSTRACT

A pyrolysis vapour condenser system (1) and a method for condensing pyrolysis vapour, the pyrolysis vapour condensing system comprising a condenser vessel (2), comprising a vapour inlet (3), and a cleaning device (9) for removing deposits from the vapour inlet (3). The cleaning device (9) is moveable between a cleaning position, in which it is disposed at least partially in the vapour inlet (3) for cleaning it, and a retracted position, in which the cleaning device (9) is retracted away from the vapour inlet (3) towards the condenser vessel (2).

16 Claims, 5 Drawing Sheets

(56) References Cited

U.S. PATENT DOCUMENTS

| | | | |
|---|---|---|---|
| 6,285,919 B1 * | 9/2001 | Randolph | ............... B08B 9/08 700/275 |
| 8,097,090 B2 | 1/2012 | Freel et al. | |
| 2012/0063965 A1 | 3/2012 | Coates et al. | |

FOREIGN PATENT DOCUMENTS

| WO | WO-2014145212 A2 * | 9/2014 | ........... B01D 5/0024 |
|---|---|---|---|
| WO | WO2015010171 A1 | 1/2015 | |

* cited by examiner

PYROLYSIS VAPOUR CONDENSER SYSTEM AND METHOD OF CONDENSING PYROLYSIS VAPOUR

The invention relates to a pyrolysis vapour condenser system, comprising a condenser vessel, which comprises a vapour inlet for feeding pyrolysis vapour to be condensed into the condenser vessel, wherein the vapour inlet comprises a tube section defining a longitudinal direction, and a cleaning device for removing deposits from the vapour inlet, the deposits being deposited thereon during a pyrolysis vapour condensation process, and thereby cleaning said inlet.

Such a system is used to condense pyrolysis vapours. During the condensation process, relatively hot pyrolysis vapour enters the condenser vessel through the vapour inlet, to be cooled and/or compressed therein to effect condensation. During the condensation process, deposits are formed. Since the pyrolysis vapour coming from the vapour inlet is relatively hot, and the condenser vessel is relatively cold, relatively large temperature differences exist in the area of the vapour inlet. Accordingly, deposits form relatively quickly on the inside of the vapour inlet. To avoid a build-up of deposits, possibly hindering the through flow of pyrolysis vapour, the inside of the inlet needs to be cleaned. The cleaning is performed using a cleaning device. Deposits form mostly during the vapour condensation process, but may also be formed if no condensation takes place. The cleaning device is used to clean the deposits regardless of their origin.

Such a system is known from U.S. Pat. No. 8,097,090 B2. The known system has the disadvantage that deposits may collect on the cleaning device. This may reduce the effectiveness of the cleaning device and/or require cleaning of the cleaning device itself.

The invention aims to at least partially solve this problem.

According to the invention, the problem is at least partially solved by a condenser system according to the preamble, characterized in that the cleaning device is moveable between a cleaning position, in which it is disposed at least partially in the vapour inlet for cleaning it, and a retracted position, in which the cleaning device is retracted away from the vapour inlet towards the condenser vessel.

The cleaning device of the system according to the invention is not used for cleaning all the time. Instead, it can be used intermittently by moving it towards the cleaning position for cleaning, and by moving towards the retracted position when no cleaning is to be performed. Thus, the cleaning device is retracted away from the vapour inlet, towards the condenser vessel when the cleaning device is not being used for cleaning. In the retracted position, the cleaning device is thus retracted away from the pyrolysis vapours coming from the inlet, i.e. it is not disposed in the hot vapour line. This reduces the amount of deposits collecting on the cleaning device, as deposits are less likely to form in said retracted position. The applicant has found that a relatively large amount of deposits forms near the vapour inlet, as a relatively large temperature differences exist in that area. Thus, by retracting the cleaning device away from the vapour inlet, the amount of deposits forming thereon can be reduced.

Throughout this application, the term pyrolysis vapour is used to describe the gaseous product of a pyrolysis process, specifically that of the pyrolysis of biomass. Said product is usually referred to as pyrolysis vapour in the art, although actually said product may be a mixture of one or more gases and/or vapours and/or aerosols. The condenser system of the invention is used to condense at least a part of the gases and/or vapours into a pyrolysis oil, in the case of pyrolysis of biomass referred to as bio-oil. Some gases, such as CO and $CO_2$, are referred to as incondensable gases or vapours, as they are not condensed using the condenser system of the invention.

The pyrolysis vapour condenser system is typically used in a temperature range of the pyrolysis vapour of 300° C.-700° C., at a gauge pressure of −20 mBar to 100 mBar, i.e. −2 kPa to 10 kPa. In the condenser vessel, the temperature is reduced to 30° C.-90° C. at a similar pressure.

The condenser vessel may have a substantially cylindrical shape. The condenser vessel may further have one or more outlets, for instance for letting out bio-oil and incondensable gases.

The condenser vessel may comprise more than one vapour inlet.

Inside the condenser vessel a spraying system may be arranged for spraying a liquid, such as condensed pyrolysis vapour, in the condenser vessel, to facilitate condensing the pyrolysis vapour.

The tube section can have any suitable cross-sectional shape, such as circular, rectangular or any other desired shape.

The longitudinal direction defined by the tube section may be substantially parallel to a centreline of the tube section and/or to a fluid flow direction.

In an embodiment of the pyrolysis vapour condenser system according to the invention, the movement of the cleaning device between the retracted position and the cleaning position describes a substantially straight line parallel to the longitudinal direction. Such an embodiment is relatively practical.

In particular said line may be parallel to or coincide with an axis substantially coinciding with the longitudinal direction. Accordingly, the cleaning device can protrude into the vapour inlet relatively far.

In another embodiment of the pyrolysis vapour condensing system, at least a part of the cleaning device is configured to rotate about an axis substantially coinciding with the longitudinal direction, for removing the deposits.

A cleaning device with a part rotating about said axis has proven particularly effective in removing deposits from the inside of the vapour inlet.

It is not required the rotating part rotates continuously, or rotates full revolutions. As an example, a reciprocating rotating movement may also be effective and is considered encompassed by this embodiment.

The pyrolysis vapour condenser system may comprise drive means for driving the cleaning device. Said drive means may be used to move the cleaning device between its cleaning position and its retracted position. Additionally or alternatively, the drive means can be used to drive rotation of the part of the cleaning device configured to rotate.

In yet another embodiment of the pyrolysis vapour condenser system according to the invention, the drive means are configured to drive the cleaning device during operation of the condenser system.

Using the drive means to drive the cleaning device during operation of the condenser system alleviates the need to stop the condensing process, thereby increasing the uptime of not only the pyrolysis vapour condenser system, but also other systems relying on the pyrolysis vapour condenser system.

During operation of the pyrolysis vapour condenser system is herein to be understood as during using the pyrolysis vapour condenser system for condensing pyrolysis vapour, including allowing pyrolysis vapour entering the condenser vessel through the inlet.

The pyrolysis vapour condenser system may be configured to temporarily reduce the input rate of pyrolysis vapour at least during cleaning of the vapour inlet.

In the cleaning position, the cleaning device may partly block the vapour inlet. By reducing the input rate of pyrolysis vapour during cleaning, a build-up of pressure due to said blockage may be prevented. A pressure build-up may be undesirable as it may increase operating risks and/or effect the efficiency of upstream processes such as pyrolysis.

The drive means may be activatable via a user interface of the pyrolysis vapour condenser system.

Accordingly a cleaning process can be started when desired by an operator.

Additionally or alternatively, the cleaning process could be started via suitable automatic control means.

In yet another embodiment of the pyrolysis vapour condenser system according to the invention, the cleaning device comprises a reamer.

Using a reamer the vapour inlet may be cleaned uniformly and/or effectively. Using a reamer may be particularly useful when the vapour inlet has a substantially circular cross-section, wherein the reamer has a cross sectional dimension corresponding to a cross sectional dimension of the vapour inlet, such that the inside of the vapour inlet can be cleaned by inserting the reamer into the vapour inlet.

The reamer may define a central axis, and further comprise a blade helically wound around the central axis and extending radially outwards away from the central axis.

Accordingly the blade can cut deposits from the inside of the vapour inlet. The shape of the blade can form a thread which, upon rotation, moves deposits according to the principle of an Archimedes' screw. In particular, the winding direction and rotation of the reamer are such that deposits are moved towards the condenser vessel. This may aid in avoiding blocking the vapour inlet.

In case the reamer has a substantially circular cross sectional shape, an outer diameter of the reamer may decrease towards a free end of the reamer, the reamer thereby having a generally tapered shape.

The tapered shape may account for a gradually increasing cleaning effect as the cleaning device is brought towards its cleaning position. This may reduce the probability of the cleaning device jamming inside the vapour inlet.

It must be noted that the outer diameter of the reamer at a certain axial position, in the case of the helically wound blade, is defined as double the radial distance of the outermost point of the blade at said axial position to a longitudinal axis of the reamer.

In yet another embodiment of the pyrolysis vapour condenser system according to the invention, the condenser vessel comprises a resealable opening through which deposits are removable from the condenser vessel.

When deposits are removed from the vapour inlet, they may collect in the condenser vessel. To avoid contamination of the condensed oil and/or avoid a (partial) blockage of one or more outlets of the condenser vessel for letting out the condensed oil, the collected deposits may be removed from the condenser vessel through the opening.

The opening may be arranged at the bottom of the condenser vessel.

In particular, the pyrolysis vapour condenser system may comprise a sluice connecting the condenser vessel to an exterior thereof, the sluice forming said resealable opening.

Using a sluice, deposits may be removed during operation, i.e. during a condensation process, of the condenser system. Moreover, the sluice may limit or avoid loss of vapours or condensed products.

The advantage of removing deposits from the condenser vessel during operation can be achieved in a pyrolysis vapour condenser system with a condenser vessel comprising the inlet, and any sort of cleaning device creating deposits. As such, the feature of the sluice also finds application in a pyrolysis vapour condenser system according to the preamble of claim 1.

The sluice may be arranged in a bottom of the condenser vessel. The sluice may comprise two doors arranged in series, so that consecutively opening the two doors allows removing deposits without creating a through-flowable path for vapour and/or pyrolysis oil in the condenser to flow directly out of the condenser vessel.

Alternatively, the pyrolysis vapour condenser system may comprise a transport screw extending from within the condenser vessel to an exterior of the condenser vessel for transporting deposits out of the condenser vessel.

Using such a transport screw, deposits may be removed from the condenser vessel at will, for instance substantially continuously during a cleaning process and/or directly thereafter, so that a build-up of deposits in the condenser vessel is avoided or limited.

The transport screw extending from within the condenser vessel should herein be interpreted as the transport screw is able to contact deposits collecting at the bottom of the condenser vessel, so as to transport said deposits out of the condenser vessel. As such, the transport screw may be disposed in for instance an extension of the condenser vessel, or in an outlet thereof.

The transport screw may have a first end, extending into the condenser vessel, and a second end, disposed outside of the condenser vessel, wherein the first end is arranged at a lower level then the second end.

Accordingly, the second end may be arranged above an intended oil level of condensed oil in the condenser, while the first end is arranged below said intended oil level. Due to the height difference between the two ends, the condensed oil is kept from flowing out of the condenser vessel. The intended oil level may correspond to the level of for instance an outlet for condensed oil.

In yet another embodiment of the pyrolysis vapour condenser system according to the invention, the cleaning device is disposed in a lower half of the condenser vessel in its retracted position.

In this embodiment, the cleaning device may be placed relatively close to the vapour inlet. Additionally or alternatively, if a spray system is used for condensing, the cleaning device may be sprayed at least when moving between its retracted and cleaning positions, thereby being cleaned by the spray system.

In yet another embodiment of the pyrolysis vapour condenser system according to the invention, the cleaning device comprises an axle which extends through a side wall of the condenser vessel.

Extending an axle through said side wall allows to position drive means for the cleaning device outside the condenser. Positioning drive means at that position is relatively practical. Moreover, the axle extending through the condenser wall may require a seal between the condenser wall and the axle. Since the condenser wall is relatively cold, as compared to for instance the vapour inlet, the seal is less susceptible to wear at this position. Moreover, at the condenser wall, the chances of deposits causing the seal to stick and/or leak may be smaller. Finally, as the axle extends to the outside of the condenser vessel, it may generally be of relatively low temperature. Arranging the axle through the condenser vessel limits the temperature difference between the axle and its surroundings as compared to placing the axle in e.g. the vapour inlet. This may aid in preventing build-up of deposits on the axle.

In particular, the pyrolysis vapour condenser system may comprise a stuffing box for rotatably sealing the axle to the condenser vessel. Other types of seals may alternatively be employed, such as labyrinth or lip seals.

The pyrolysis vapour condenser system may further comprise a cleaning liquid dispenser for dispensing cleaning liquid into the stuffing box for cleaning stuffing in the stuffing box.

By cleaning the stuffing of the stuffing box, it may be durable and require replacement less often. The cleaning liquid may be any liquid suitable to dissolve and/or clean pyrolysis oil and/or deposits, such as short chain alcohols, in particular ethanol.

In yet another embodiment of the pyrolysis vapour condenser system according to the invention, the pyrolysis vapour condenser system further comprises a protective housing into which at least part of the cleaning device is moveable in its retracted position.

Protecting the cleaning device in its retracted position may reduce the likelihood of deposits collecting on the cleaning device, thereby reducing or removing the need to clean the cleaning device.

The housing may be formed by the condenser vessels' wall, for instance by a protrusion therefrom. Alternatively the housing may be attached to the condenser vessel wall. In particular, the housing may open towards the condenser vessel, but be closed otherwise.

In yet another embodiment of the pyrolysis vapour condenser system according to the invention, in the cleaning position of the cleaning device, the cleaning device leaves free at least 20% of an inner cross sectional area of the vapour inlet for vapour to flow into the condenser vessel from the vapour inlet, wherein preferably the cleaning device leaves free at least 30%, more preferably at least 40% and most preferably at least 50% of said inner cross sectional area.

Leaving free a part of the inner cross sectional area allows flow of pyrolysis vapour through the vapour inlet towards the condenser. Accordingly, operation of the condenser system need not be stopped.

The invention also relates to a method of condensing pyrolysis vapour using a pyrolysis vapour condenser system, the condenser system preferably having the features described above, wherein the method comprises:
  feeding pyrolysis vapour to a condenser vessel via a vapour inlet of the condenser vessel;
  condensing the pyrolysis vapour in the condenser vessel; and
  outputting condensed pyrolysis products,
  the method further comprising:
  moving a cleaning device from a retracted position, in which the cleaning device is retracted away from the vapour inlet towards the condenser vessel, to a cleaning position in which it is disposed at least partially in the vapour inlet; and
  cleaning the vapour inlet by removing deposits therefrom using the cleaning device.

Retracting the cleaning device away from the vapour inlet when it is not used, may reduce the amount of or the likelihood of deposits collecting on the cleaning device.

The condenser system may have any of the above described features, alone or in any suitable combination, and may offer the corresponding advantages.

The method may further comprise removing deposits from the condenser vessel through a sluice while continuing use of the pyrolysis vapour condenser system. Continuing use may herein mean that operation, e.g. condensation is not interrupted. In particular, pyrolysis vapour may continue to be fed.

The sluice may allow continuing operation while removing deposits from the vessel. As explained above, the advantage of the sluice can be achieved regardless of the type of cleaning device used. As such, the step of moving a cleaning device can be omitted in the above-described method. In fact, a sluice finds use in combination with any cleaning step removing deposits from the inlet, as such deposits may be removed via the sluice.

In an embodiment of the method, at least the feeding step and the cleaning step are conducted concurrently. Accordingly, a condensing process need not be stopped during cleaning, increasing the uptime of the condenser system and any system relying on the condenser system.

In another embodiment of the method, the pyrolysis vapour is input at a first input rate during the feeding step, and the pyrolysis vapour is input at a second input rate during the cleaning step, wherein the second input rate is lower than the first input rate. In this embodiment, the input rate of pyrolysis vapour is thus lowered during cleaning.

This may avoid or reduce a build-up of pressure. Reducing said input rate may be achieved by reducing the rate of a pyrolysis process producing the pyrolysis vapour, i.e. by pyrolyzing less material per unit of time. The input rate may be lowered by 30% or more, preferably by 40% or more, and most preferably by 50% or more.

The method may further comprise cleaning stuffing of the stuffing box using a cleaning fluid. This may increase the lifespan of the stuffing.

In particular the invention relates to a method of condensing pyrolysis vapour made by pyrolyzing biomass. The above-described advantages are particularly useful when condensing pyrolysis vapours from biomass, as they tend to form a lot of deposits as compared to pyrolysis vapour from other sources. The invention may therefore also relate to a method of pyrolyzing biomass, including the method of condensing the resulting pyrolysis vapour as described above.

The invention will be further elucidated with reference to the attached figures, in which.

In the figures, like elements are referred to using like reference numerals. Like elements of different embodiments are identified with reference numerals that have been increased by 100 (one hundred).

Figure 1A:
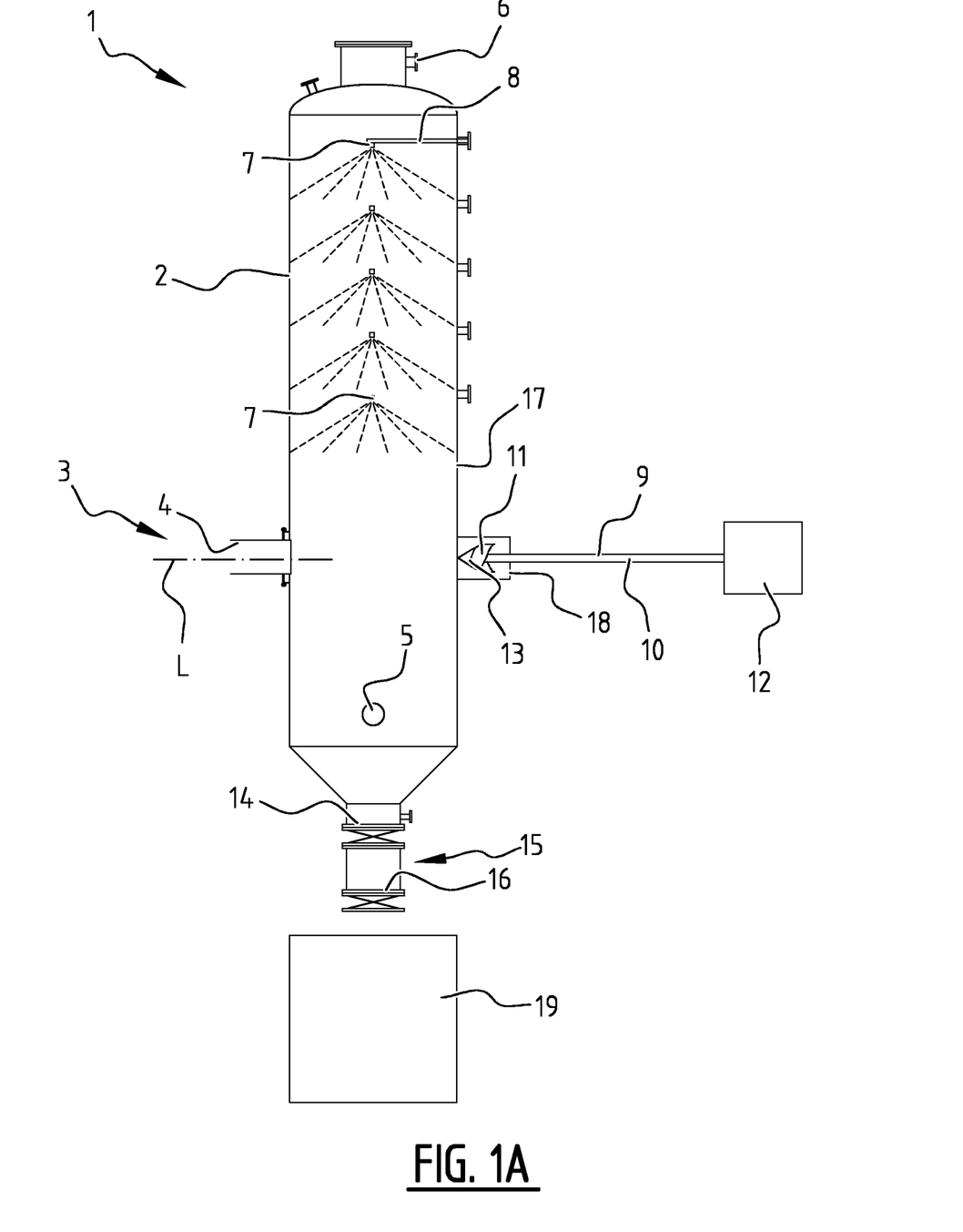
FIGS. 1A and 1B schematically show a longitudinal cross-sectional view of an embodiment of a pyrolysis vapour condenser system according to the invention.
Figure 1B:
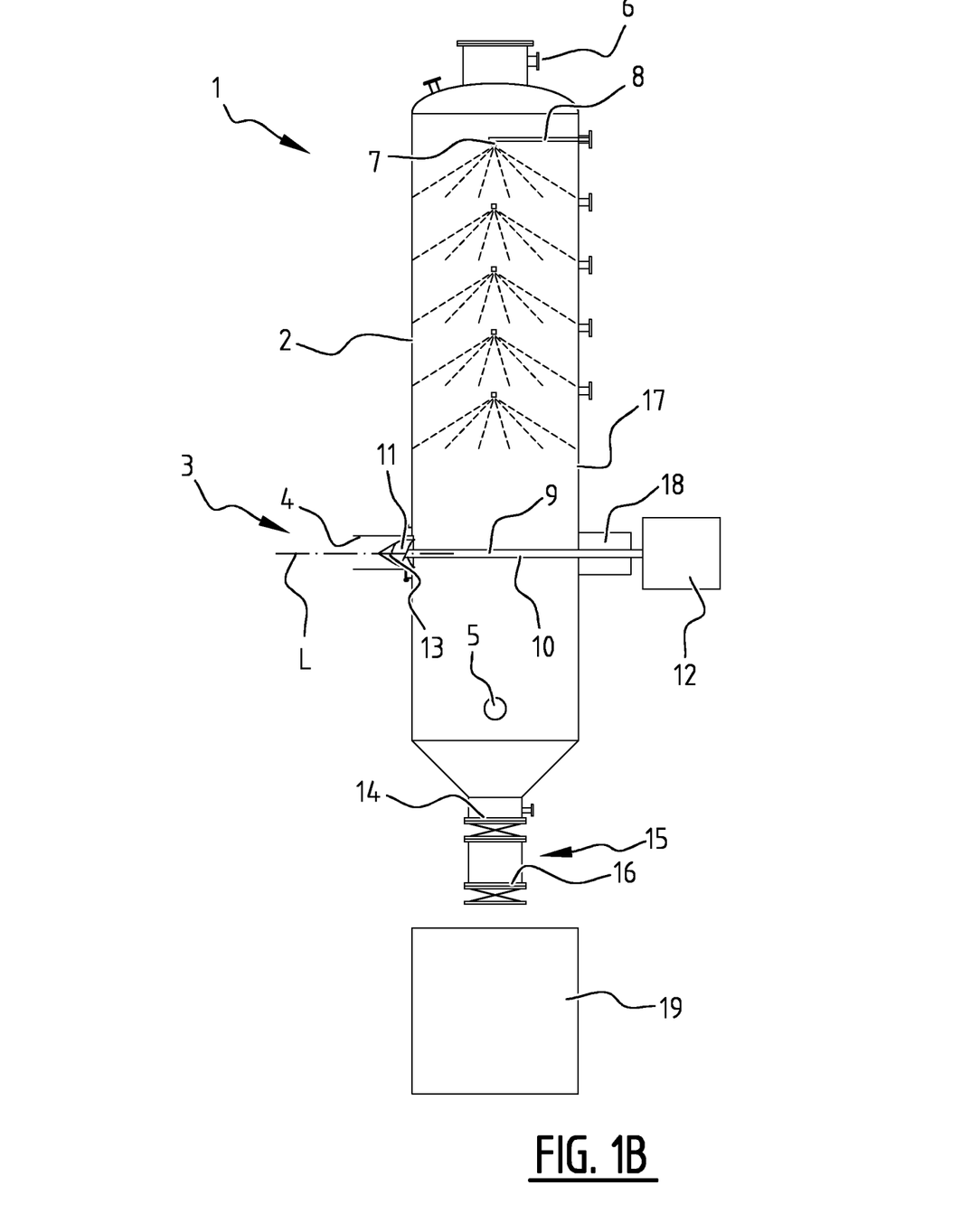

FIGS. 1A and 1B show a pyrolysis vapour condenser system 1. The pyrolysis vapour condenser system 1 has a condenser vessel 2 which has a vapour inlet 3. The pyrolysis vapour condenser system 1 can be used to condense pyrolysis vapour that originates from the pyrolysis of biomass in a pyrolysis reactor (not shown). The pyrolysis vapour is supplied into the condenser vessel 2 via the vapour inlet 3. The vapour inlet comprises a tube section 4 which defines a longitudinal direction L. The longitudinal direction L coincides with a centre axis of the tube section 4. The tube section 4 in this example has a circular cross-section, since it is formed of a pipe. The condenser vessel 2 shown further has an outlet 5 for letting out condensed products, such as oil referred to as pyrolysis oil or bio-oil. Further, an outlet 6 for letting out non-condensed gasses is provided. The pyrolysis vapour condenser system 1 condenses with the aid of a spraying system consisting of a plurality of sprayers 7 supplied via spraying supply lines 8. For the sake of clarity, not all sprayers 7 are provided with a reference number, and only one supply line 8 is shown. The sprayer system may be used to spray the condensed product, i.e. bio-oil, or another liquid. During the condensation of pyrolysis vapour, the vapour cools down. This prompts the formation of deposits, since deposits may form where condensed pyrolysis vapour comes into contact with relatively hot surfaces, such as surfaces of over 100° C. The pyrolysis vapour entering the vapour inlet 3 is relatively hot, whereas pyrolysis vapour in the condenser vessel 2 has cooled down substantially. Accordingly, there exists a temperature difference around the vapour inlet 3. As such, deposits form at least in the vicinity of the vapour inlet 3, since the vapour inlet may be relatively hot, whilst some of the pyrolysis vapour has already condensed in the vicinity of the vapour inlet. The deposits can form a layer on the inside of the tube section 4, thereby at least partially clogging the tube section 4, and thus possibly hindering the supply of pyrolysis vapour. To periodically clean the vapour inlet 3, a cleaning device 9 has been provided. According to the invention, the cleaning device is moveable between a cleaning position (see FIG. 1B) and a retracted position (see FIG. 1A). In the cleaning position, the cleaning device 9 is disposed at least partially in the vapour inlet 3 for cleaning it, or rather, the inside of it. In the retracted position, the cleaning device 9 is retracted away from vapour inlet 3 towards the condenser vessel 2. The retracted position is directly opposite the vapour inlet 3, on a far side of the condenser vessel 2. Accordingly, the cleaning device 9 moves in a substantially straight line parallel to the longitudinal direction. In this example, the cleaning device 9 includes an axle 10 and a head 11. The cleaning device 9 is moved by displacing the axle in the longitudinal direction L through the condenser vessel 2 from the retracted position towards the cleaning position and vice versa. The axle 10 extends through a side wall 17 of the condenser vessel 2. Although not shown in the embodiment of FIGS. 1A and 1B, a stuffing box 50 (see FIG. 3) can be used to seal the axle 10 to the side wall 17, whilst allowing rotation of the axle 10. On the outside of the side wall 17 of the condenser vessel, a protective housing 18 is arranged. The housing 18 protrudes from the condenser vessel 2, opens towards the condenser vessel 2 and is otherwise closed. Accordingly, the cleaning device 9 can be retracted to its retracted position, so that the head 11 is placed in the protective housing 18.

Drive means 12 are provided for driving the movement of the cleaning device 9 between its positions. The drive means 12 further rotate the head 11 of the cleaning device 9 about an axis of rotation, which coincides with the longitudinal direction L and with a centreline of the axle 10. The head 11 is formed by a reamer 11. The reamer 11 defines a central axis, which is an extension of the centreline of the axle 10, and thus coincides with its axis of rotation. The reamer 11 comprises a blade 13 which is helically wound around the central axis which extends radially outwards away from the central axis. An outer diameter of the reamer 11 is relatively large near the axle 10, and decreases towards the free end of the reamer 11. The blade 13 forms a thread, which according to the principle of an Archimedes' screw transports deposits towards the condenser vessel 2 when the reamer 11 rotates. The deposits then collect at the bottom of the condenser vessel 2. In their retracted position, but in this particular embodiment also in the cleaning position, the cleaning means 9 are disposed in a lower half of the condenser vessel 2. Accordingly, they are disposed below the sprayers 7, so that when the cleaning device is or has been used, it is sprayed by the sprayers 7. An area between consecutive windings of the blade 13 forms a channel through which pyrolysis vapour can flow. Accordingly, the reamer 11 has a certain area referred to as free flow area, which is an area left free for the passage of pyrolysis vapour. In this example, the free flow are is about 50% of a transversal cross-sectional area of the vapour inlet 3, so that while the cleaning device 9 is in the cleaning position, pyrolysis vapour can still flow into the condenser vessel 2 from the vapour inlet through the channels between the consecutive windings of the blade 13.

The drive means 12 are configured to drive the cleaning device 9 while the pyrolysis vapour condenser system 1 is in use, i.e. while a condensation process is being performed. For this purpose, the drive means 12 are connected to an interface (not shown) which a user can use to activate the drive means 12 in order to clean the vapour inlet 3 using the cleaning device 9.

As shown in this embodiment, an opening 14 is provided at the bottom of the condenser vessel 2. The opening 14 can be opened and closed. The opening 14 is part of a sluice 15, which further consists of a second opening 16, which can also be opened and closed. By opening and closing the openings 14 and 16 consecutively deposits can be removed from the condenser vessel 2 to be collected, for instance in a container 19, at the bottom of the condenser vessel 2.

Figure 2A:
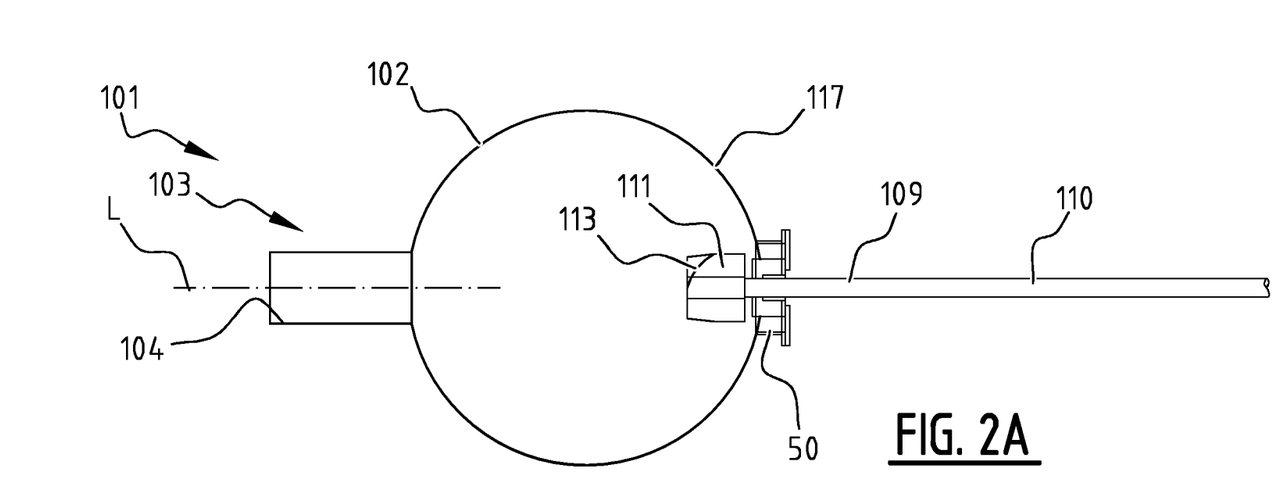
FIGS. 2A and 2B schematically show a transversal cross-sectional view of another embodiment of a pyrolysis vapour condenser system according to the invention.
Figure 2B:
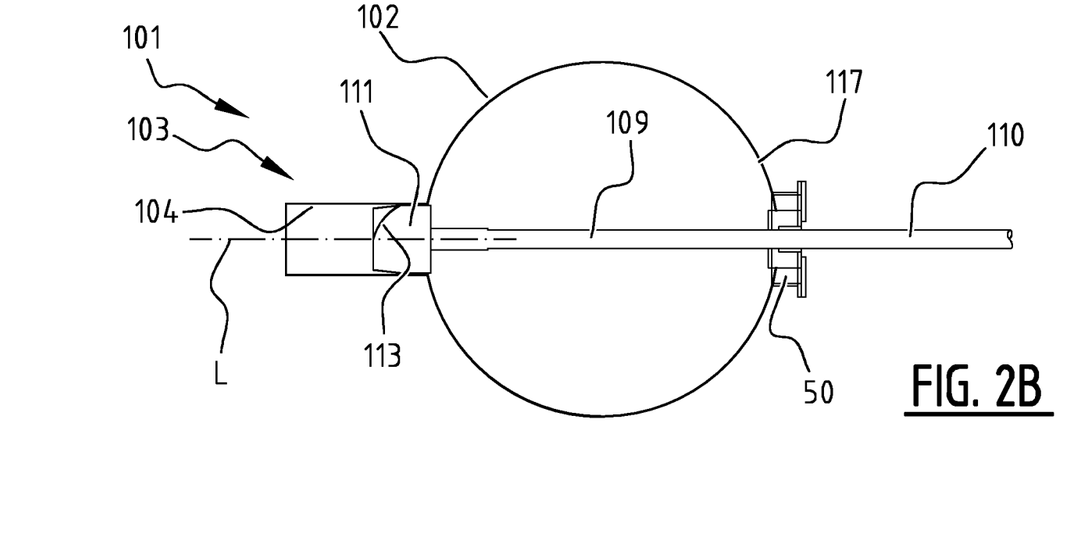

FIGS. 2A and 2B show another embodiment of the pyrolysis vapour condenser system 101. The embodiment of FIGS. 2A and 2B is largely the same as the described embodiment of FIGS. 1A and 1B. Only the mutual differences will therefore be described herein. In this embodiment, no protective housing is provided. Accordingly, in its retracted position, the cleaning device 109 and more specifically its head 111 is disposed in the condenser vessel 102 towards the inside of its side wall 117. Moreover, in this figure the stuffing box 50 is more clearly shown.

Figure 3:
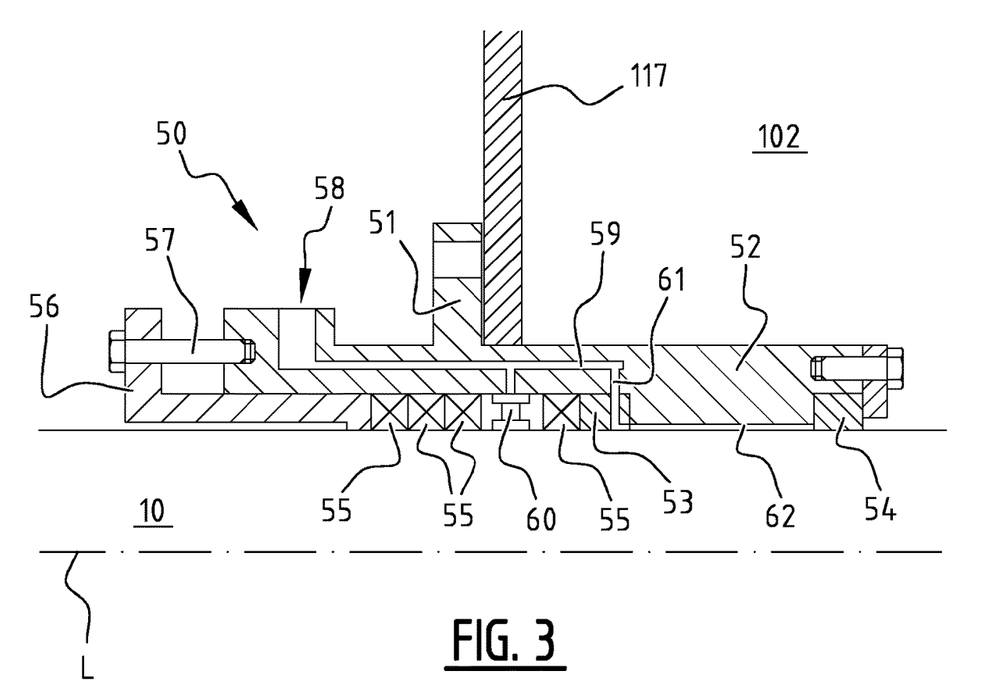
FIG. 3 schematically shows a cross-sectional view of a stuffing box that can be used in pyrolysis vapour condenser systems according to the invention.

FIG. 3 shows in more detail a top part of the stuffing box 50. The stuffing box 50 includes a connector 51 for connecting the stuffing box 50 to an opening in a side wall 117 of the condenser vessel 102. The stuffing box 50 further includes a main body 52 of generally cylindrical shape. The axle 10 of the cleaning device 9 extends through the main body 52. The main body 52 defines two receiving spaces for guide rings 53, 54 which contact the axle 10 in order to guide the axle 10 in rotation. The stuffing box 50 further includes stuffing rings 55 configured to seal around the axle 10, whilst allowing the axle 10 to rotate. A pressure on the stuffing rings 55 can be adjusted by moving a pressing element 56 using adjustment bolt 57. The stuffing box 50 is further provided with an inlet 58 for receiving cleaning fluid. The inlet can be connected to a suitable liquid dispenser (not shown). The inlet connects via a channel 59 in the main body 52 to a ring 60 with radial perforations, which is disposed between the stuffing rings 55. Via the perforations in the ring 60, cleaning fluid from the channel 59 can be fed to the stuffing rings 55, the axle 10 in order to clean and/or lubricate their respective surfaces. A further channel 61 connects the channel 59 to an annular space 62 between the guide rings 53, 54, in order to supply said annular space 62 with cleaning fluid. From there, the axle 10 and the guide rings 53, 54 are cleaned using the cleaning fluid.

Figure 4:
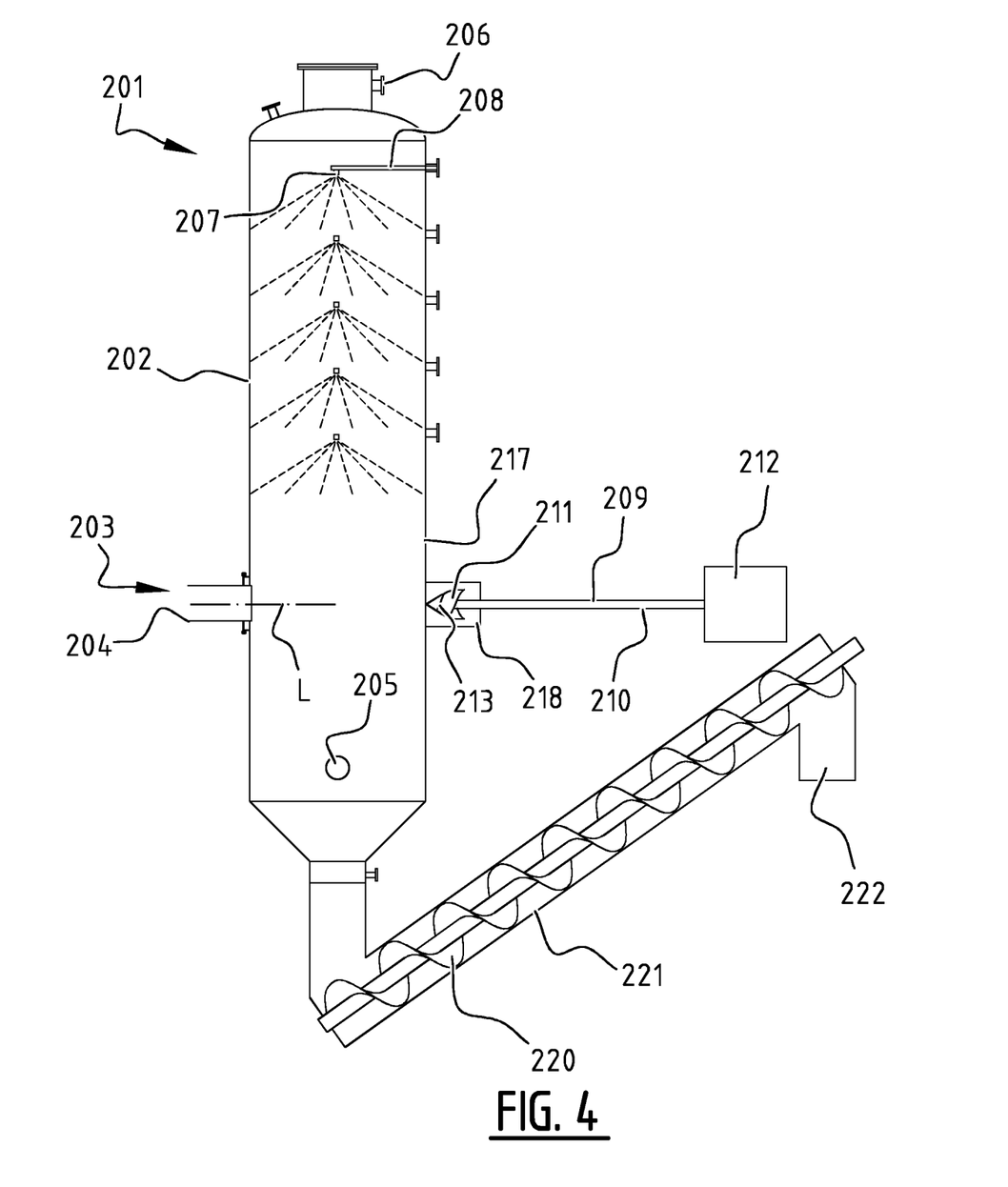
FIG. 4 schematically shows yet another embodiment of a pyrolysis vapour condenser system according to the invention.

FIG. 4 shows another embodiment of the pyrolysis vapour condenser system 201, similar to that of FIGS. 1A and 1B. However, in this embodiment, instead of the sluice 15 the condenser vessel 202 connects to a conveyer screw 220 which transports deposits upwards out of the condenser vessel 202 through a conduit 221 to an outlet 222 where the deposits can be collected.

Although the invention has been described hereabove with reference to a number of specific examples and embodiments, the invention is not limited thereto. Instead, the invention also covers the subject matter defined by the claims, which now follow.

The invention claimed is:

1. A pyrolysis vapour condenser system, comprising:
 a pyrolysis reactor pyrolyzing biomass, the pyrolysis reactor configured to have a variable rate of pyrolysis expressed in amount of material pyrolyzed per unit of time; and
 a condenser vessel, comprising a vapour inlet for feeding pyrolysis vapour from the pyrolysis reactor to be condensed into the condenser vessel, wherein the vapour inlet comprises a tube section defining a longitudinal direction; and
 a cleaning device for removing deposits from the vapour inlet, deposited thereon during a pyrolysis vapour condensation process, and thereby cleaning said inlet,
 characterized in that the cleaning device is moveable between a cleaning position, in which it is disposed at least partially in the vapour inlet for cleaning it, and a retracted position, in which the cleaning device is retracted away from the vapour inlet towards the condenser vessel,
 wherein the pyrolysis vapour condenser system is further configured to temporarily reduce the input rate of pyrolysis vapour at least during cleaning of the vapour inlet by reducing the rate of pyrolysis by pyrolyzing less material per unit of time in the pyrolysis reactor, thereby avoiding or reducing a build-up of pressure during said cleaning.

2. The pyrolysis vapour condenser system according to claim 1, wherein the movement of the cleaning device between the retracted position and the cleaning position describes a substantially straight line parallel to the longitudinal direction.

3. The pyrolysis vapour condenser system according to claim 1, wherein at least a part of the cleaning device is configured to rotate about an axis substantially coinciding with the longitudinal direction, for removing the deposits.

4. The pyrolysis vapour condenser system according to claim 1, further comprising drive means for driving the cleaning device, wherein optionally the drive means are configured to drive the cleaning device during operation of the condenser system.

5. The pyrolysis vapour condenser system according to claim 4, further comprising a user interface, wherein the drive means are activatable via the user interface.

6. The pyrolysis vapour condenser system according to claim 1, wherein the cleaning device comprises a reamer, wherein optionally the reamer defines a central axis, the reamer further comprising a blade helically wound around the central axis and extending radially outwards away from the central axis.

7. The pyrolysis vapour condenser system according to claim 6, wherein an outer diameter of the reamer decreases towards a free end of the reamer, the reamer thereby having a generally tapered shape.

8. The pyrolysis vapour condenser system according to claim 1, wherein the condenser vessel comprises a resealable opening through which deposits are removable from the condenser vessel, further comprising a sluice connecting the condenser vessel to an exterior thereof, the sluice forming said resealable opening.

9. The pyrolysis vapour condenser system according to claim 1, further comprising a transport screw extending from within the condenser vessel to an exterior of the condenser vessel for transporting deposits out of the condenser vessel.

10. The pyrolysis vapour condenser system according to claim 1, wherein in its retracted position the cleaning device is disposed in a lower half of the condenser vessel.

11. The pyrolysis vapour condenser system according to claim 1, wherein the cleaning device comprises an axle which extends through a side wall of the condenser vessel, optionally further comprising a stuffing box for rotatably sealing the axle to the condenser vessel, optionally further comprising a cleaning liquid dispenser for dispensing cleaning liquid into the stuffing box for cleaning stuffing in the stuffing box.

12. The pyrolysis vapour condenser system according to claim 1, further comprising a protective housing into which at least part of the cleaning device is moveable in its retracted position.

13. The pyrolysis vapour condenser system according to claim 1, wherein in the cleaning position the cleaning device leaves free at least 20% of an inner cross sectional area of the vapour inlet for vapour to flow into the condenser vessel from the vapour inlet.

14. The pyrolysis vapour condenser system according to claim 13, wherein in the cleaning position the cleaning device leaves free at least 30% of an inner cross sectional area of the vapour inlet for vapour to flow into the condenser vessel from the vapour inlet.

15. The pyrolysis vapour condenser system according to claim 1, wherein the pyrolysis reactor is configured to have a variable rate of pyrolysis expressed in amount of material pyrolyzed per unit of time that may be lowered by 30% or more.

16. The pyrolysis vapour condenser system according to claim 1, wherein the system comprises a control means configured to provide for the variable rate of pyrolysis.

* * * * *